UNITED STATES PATENT OFFICE.

ANSON K. CROSS, OF BOSTON, MASSACHUSETTS.

CRAYON OR PENCIL.

SPECIFICATION forming part of Letters Patent No. 566,845, dated September 1, 1896.

Application filed December 19, 1895. Serial No. 572,717. (No specimens.)

*To all whom it may concern:*

Be it known that I, ANSON K. CROSS, a citizen of the United States, residing at Boston, in the county of Suffolk and State of Massachusetts, have invented a new and useful Composition of Matter to be Used as a Crayon or Pencil, of which the following is a specification.

My improvement consists in the addition to the ingredients wax, soap, gum, coloring, &c., usually found in lithographic and similar crayons of a small amount of diatomaceous silica. This silica gives hardness to the mixture and also gives a tooth which causes the crayon to take hold more readily of polished surfaces upon which it may be used to mark. The qualities of this silica which cause it to be particularly adapted for use in lithographic or other crayons of a similar waxy nature are the minuteness of the particles, the fact that they mix perfectly with the other ingredients of the crayons, and also the fact that the particles of diatomaceous silica are of a porous nature and of angular and irregular forms, so that the particles of wax permeate the silica and bind the whole together, giving hardness, strength, and tooth to the crayon at the same time. The amount of diatomaceous silica which produces the best crayon varies with the use to which the pencil is to be put. For drawing upon glass and other highly-polished surfaces a small amount of silica is sufficient. For drawing upon paper, leather, or surfaces less hard and polished than glass a harder pencil may be used. This will be obtained by increasing the amount of diatomaceous silica, but not enough should be added to make the pencil brittle or destroy the adhesiveness of its oily substances which cause it to mark upon smooth surfaces. The quantity of diatomaceous silica used may range from about five to thirty per cent. of the weight of all the other ingredients of the pencil. This silica will improve any crayon having an oily base, and is particularly valuable in the composition for which I have obtained the United States Patent No. 508,469, bearing date November 14, 1893. In this crayon I prefer to use ozocerite, soap, a hardening-gum, coloring-matter, and diatomaceous silica, the proportions of the different ingredients being about as specified and being varied to suit the use for which the pencil is required. Thus for use in connection with the transparent drawing-slate for which I have obtained the United States Patent No. 508,468, bearing date November 14, 1893, the proportion of ozocerite will be much smaller than when the pencil is to be used for marking china, &c., and it is not desired that the marks be readily erased. Increasing the amount of ozocerite increases the adhesiveness of the pencil. It is hardened by increasing the amount of gum and also by increasing the amount of silica. Soap softens the pencil.

To obtain the crayon, the different ingredients are to be melted together, the coloring-matter and diatomaceous silica being added last. When thoroughly mixed, the mass is to be formed into crayons by running it into molds or through a die, or by stamping or cutting partly-hardened sheets into any desired form.

What I claim, and desire to secure by Letters Patent, is—

1. A crayon or pencil having waxy or oily ingredients combined with diatomaceous silica.

2. In a crayon or pencil the combination of waxy or oily ingredients with suitable coloring-matter, and diatomaceous silica.

3. In a crayon or pencil the combination of ozocerite, gum, coloring-matter, and diatomaceous silica.

4. In a crayon or pencil the combination of ozocerite, soap, gum, coloring-matter, and diatomaceous silica.

ANSON K. CROSS.

Witnesses:
CHAS. F. PERKINS,
HERBERT W. TROWBRIDGE.